(12) United States Patent
Leatham et al.

(10) Patent No.: US 10,775,274 B2
(45) Date of Patent: Sep. 15, 2020

(54) ANALYZING MACHINERY OPERATING PARAMETERS

(71) Applicant: General Electric Company, Schenectady, NY (US)

(72) Inventors: David Harris Leatham, Carson City, NV (US); Matthew Dean Anderson, Minden, NV (US)

(73) Assignee: BAKER HUGHES, A GE CONIPANY, LLC, Houston, TX (US)

( * ) Notice: Subject to any disclaimer, the term of this patent is extended or adjusted under 35 U.S.C. 154(b) by 361 days.

(21) Appl. No.: 14/824,457

(22) Filed: Aug. 12, 2015

(65) Prior Publication Data

US 2017/0045420 A1 Feb. 16, 2017

(51) Int. Cl.
*G01M 99/00* (2011.01)
*G05B 23/02* (2006.01)

(52) U.S. Cl.
CPC ....... *G01M 99/005* (2013.01); *G05B 23/0256* (2013.01)

(58) Field of Classification Search
CPC .......................... G01M 99/005; G05B 23/0256
See application file for complete search history.

(56) References Cited

U.S. PATENT DOCUMENTS

| | | | |
|---|---|---|---|
| 4,456,963 A | 6/1984 | Wiggins | |
| 5,471,400 A * | 11/1995 | Smalley | G01M 3/26 702/51 |
| 6,292,757 B1 | 9/2001 | Flanagan et al. | |
| 7,056,097 B2 | 6/2006 | Lake | |
| 7,124,057 B2 | 10/2006 | Forster et al. | |
| 7,186,094 B2 | 3/2007 | Edlund et al. | |
| 7,418,355 B2 | 8/2008 | Grant et al. | |
| 7,463,995 B2 | 12/2008 | Stansbury et al. | |
| 8,147,211 B2 | 4/2012 | Grant et al. | |
| 8,510,015 B2 | 8/2013 | Beausoleil et al. | |

(Continued)

OTHER PUBLICATIONS

Klein et al., "Compression Ration Estimation Based on Cylinder Pressure Data", Control Engineering Practice, vol. No. 14, Issue No. 03, pp. 197-211, Mar. 1, 2006.

(Continued)

*Primary Examiner* — Matthew G Marini
(74) *Attorney, Agent, or Firm* — Mintz Levin Cohn Ferris Glovsky and Popeo, P.C.

(57) ABSTRACT

A method and system for analyzing machinery operating parameters are provided. The method is implemented using a computing device coupled to a user interface and a memory device. The method can include determining an ideal curve of a first operating parameter of a machine that can include a plurality of component parts. The method also can include receiving an indication of a second operating parameter of the machine and receiving an indication of the first operating parameter of the machine wherein the indication of the first operating parameter is correlated to the received indication of the second operating parameter. The method further can include normalizing the indication of the first operating parameter to the ideal curve of the first operating parameter and determining a condition of the machine based on the normalizing of the indication of the first operating parameter to the ideal curve of the first operating parameter.

37 Claims, 11 Drawing Sheets

(56) References Cited

U.S. PATENT DOCUMENTS

| | | |
|---|---|---|
| 8,807,959 B2 | 8/2014 | Grant et al. |
| 2003/0077179 A1 | 4/2003 | Collins et al. |
| 2007/0132603 A1 | 6/2007 | Edlund et al. |
| 2010/0256927 A1* | 10/2010 | Hala .................... F04B 49/225 702/33 |
| 2013/0218484 A1* | 8/2013 | Kar ....................... G01K 13/08 702/36 |
| 2015/0309200 A1* | 10/2015 | Zharnikov .............. G01V 1/48 702/11 |

OTHER PUBLICATIONS

European Search Report and Opinion issued in connection with Corresponding Application No. 16182960.1 dated Nov. 3, 2016.

* cited by examiner

ANALYZING MACHINERY OPERATING PARAMETERS

BACKGROUND

Operators of machinery often have access to many pieces of data relating to the operation of the machinery. Much of the data is presented in relatively raw form and the operator must use their training and experience to decipher the information in the presentation. For example, graphs of machine parameters are often presented over a span of time with no context or background to assist the operator in interpreting the information in the graph. Often the operator has an ability to plot one graph on top of another to facilitate a correlation between various parameters. However, the operator is required to manually present this information on a display, which is time consuming and may not be useful during troubleshooting when the operating condition of the machine is deteriorating before it finally actuates a protective feature, taking it offline.

BRIEF DESCRIPTION

This disclosure generally describes machine condition monitoring, and, some embodiments, analyzing machine operating parameters and presenting the results of the analysis In one embodiment, a method can be implemented using a computing device coupled to a user interface and a memory device. The method can include determining an ideal curve of a first operating parameter of a machine that can include a plurality of component parts. The method also can include receiving an indication of a second operating parameter of the machine from a physical or virtual sensor configured to monitor the second operating parameter and receiving an indication of the first operating parameter of the machine from a physical or virtual sensor configured to monitor the first operating parameter, the indication of the first operating parameter correlated to the received indication of the second operating parameter. The method further can include normalizing the indication of the first operating parameter to the ideal curve of the first operating parameter wherein normalizing the first operating parameter comprises scaling the first operating parameter with respect to the ideal curve and determining a condition of the machine based on the normalizing of the indication of the first operating parameter to the ideal curve of the first operating parameter.

In another embodiment, a machinery analysis system can include a computing device communicatively coupled to a user interface and a memory device. The system also can include a thermodynamic model of at least a portion of a machine stored in the memory device wherein the model can be configured to generate an ideal curve of a first operating parameter of the machine that can include a plurality of component parts. The system further can include a sensor configured to generate an indication of a second operating parameter of the machine and a sensor configured to generate an indication of the first operating parameter of the machine wherein the indication of the first operating parameter can be correlated to the generated indication of the second operating parameter. The computing device can be configured to normalize the indication of the first operating parameter to the ideal curve of the first operating parameter and determine a condition of the machine based on the normalizing of the indication of the first operating parameter to the ideal curve of the first operating parameter.

In yet another embodiment, one or more non-transitory computer-readable storage media has computer-executable instructions embodied thereon. When executed by at least one processor, the computer-executable instructions cause the processor to determine an ideal curve of a first operating parameter of a machine that can include a plurality of component parts. The computer-executable instructions also cause the processor to receive an indication of a second operating parameter of the machine and receive an indication of the first operating parameter of the machine that can be correlated to the received indication of the second operating parameter. The computer-executable instructions further cause the processor to normalize the indication of the first operating parameter to the ideal curve of the first operating parameter and determine a condition of the machine based on the normalizing of the indication of the first operating parameter to the ideal curve of the first operating parameter.

BRIEF DESCRIPTION OF THE DRAWINGS

FIG. 1 is a schematic illustration of an exemplary reciprocating compressor including a condition monitoring system.

FIG. 2 is a cross-sectional view of the reciprocating compressor show in FIG. 1 taken along line 2-2.

FIG. 3 is a block diagram of the condition monitoring system shown in FIG. 1.

FIG. 4 is a block diagram of the protection system shown in FIG. 1.

FIG. 5 is a block diagram of the user computing device shown in FIG. 3.

FIG. 6 is a schematic block diagram of a sensor channel that may be used with condition monitoring system and/or protection system both shown in FIG. 1.

FIG. 7 is a graph of crank end pressure versus crank angle α during an exemplary complete compressor operation cycle of the reciprocating compressor shown in FIG. 1.

FIG. 8 is a graph of another representation of the graph shown in FIG. 7 that shows only the normalized raw data with respect to the adiabatic curve at a smaller scale.

FIG. 9 is a graph of crank end pressure versus crank angle α during another exemplary complete compressor operation cycle of the reciprocating compressor shown in FIG. 1.

FIG. 10 is a graph of another representation of the graph shown in FIG. 9 that shows only the difference between the normalized raw data and the adiabatic curve.

FIG. 11 is a graph of crank end pressure versus crank angle α during a complete compressor operation cycle of the reciprocating compressor shown in FIG. 1.

FIG. 12 is a graph of another representation of the graph shown in FIG. 11 that shows only the difference between the normalized raw data and the adiabatic curve.

FIG. 13 is a flowchart of an exemplary method of analyzing machinery operating parameters in accordance with an exemplary embodiment of the present disclosure.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to analytical and methodical embodiments of analyzing machinery operation in industrial, commercial, and residential applications.

The following description refers to the accompanying drawings, in which, in the absence of a contrary representation, the same numbers in different drawings represent similar elements.

Embodiments of the present disclosure describe techniques for improving a presentation of monitored process parameters of a machine. For example, a reciprocating compressor includes many components that work together in a precise manner to generate a flow of relatively high pressure gas. To facilitate a long service life and efficient operation, many of the process parameters of the reciprocating compressor are monitored by physical sensors or by virtual sensors to continuously determine an operating condition of the reciprocating compressor. Some of the monitored process parameters are compared to threshold ranges, outside of which, a monitoring system alerts operators of a potential undesirable condition. A monitoring technique, which is described in greater detail herein below, uses an ideal representation of one or more of the monitored process parameter to highlight deviations from an expected value predicted by the ideal representation. The ideal representation can be embodied in an algorithm, such as, but not limited to a model, a set of rules, a lookup table, or combinations of the above. Some conditions of the reciprocating compressor exhibit tell-tail characteristics that can be visualized when the process parameter is plotted along with the ideal representation for that process parameter. As described more fully below, some embodiments of the disclosed subject matter relate to a condition monitoring system for a reciprocating compressor. Other embodiments are within the scope of the disclosed subject matter.

Figure 1:
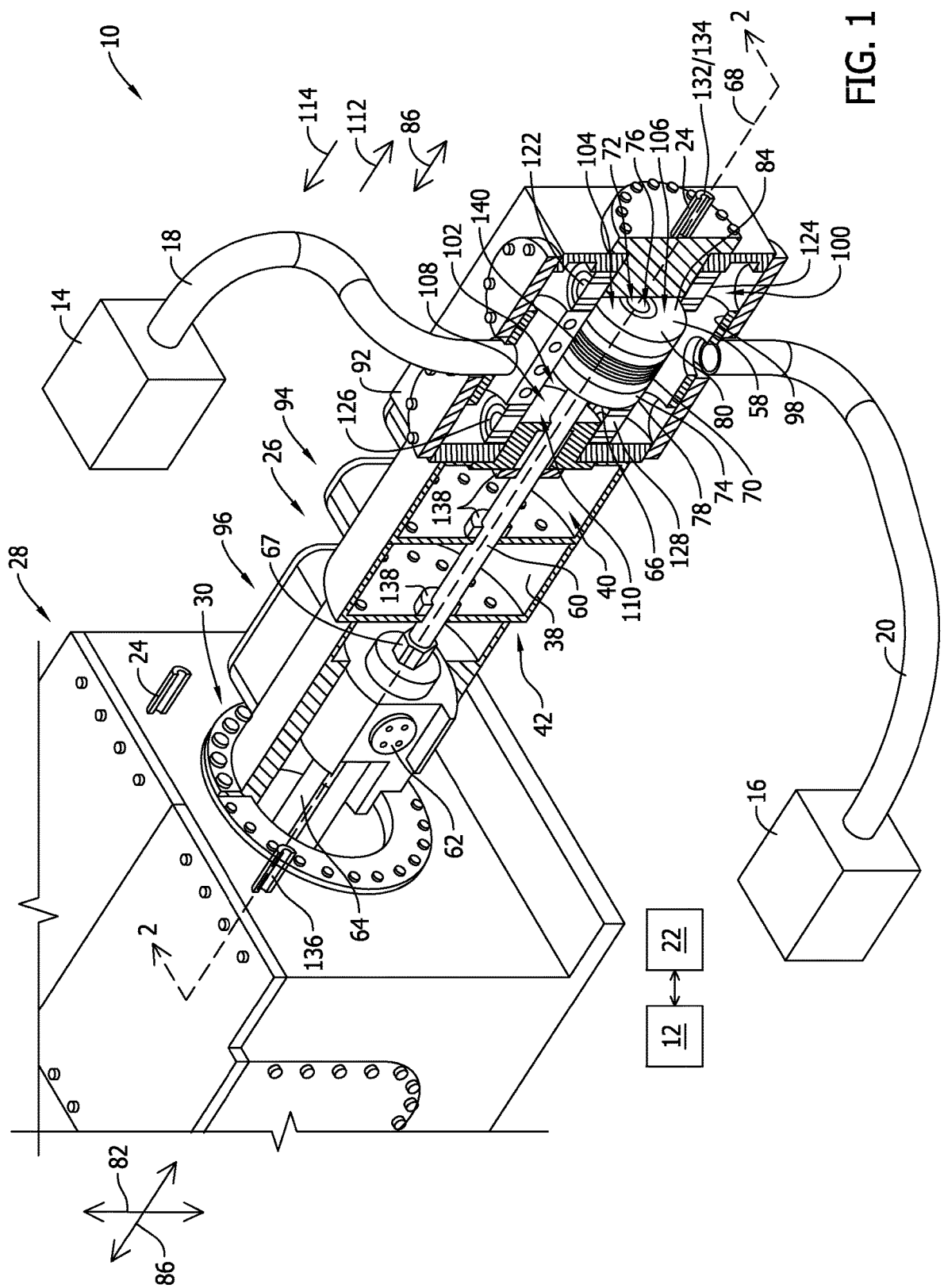
FIGS. 1-13 show exemplary embodiments of the method and apparatus described herein.
Figure 2:
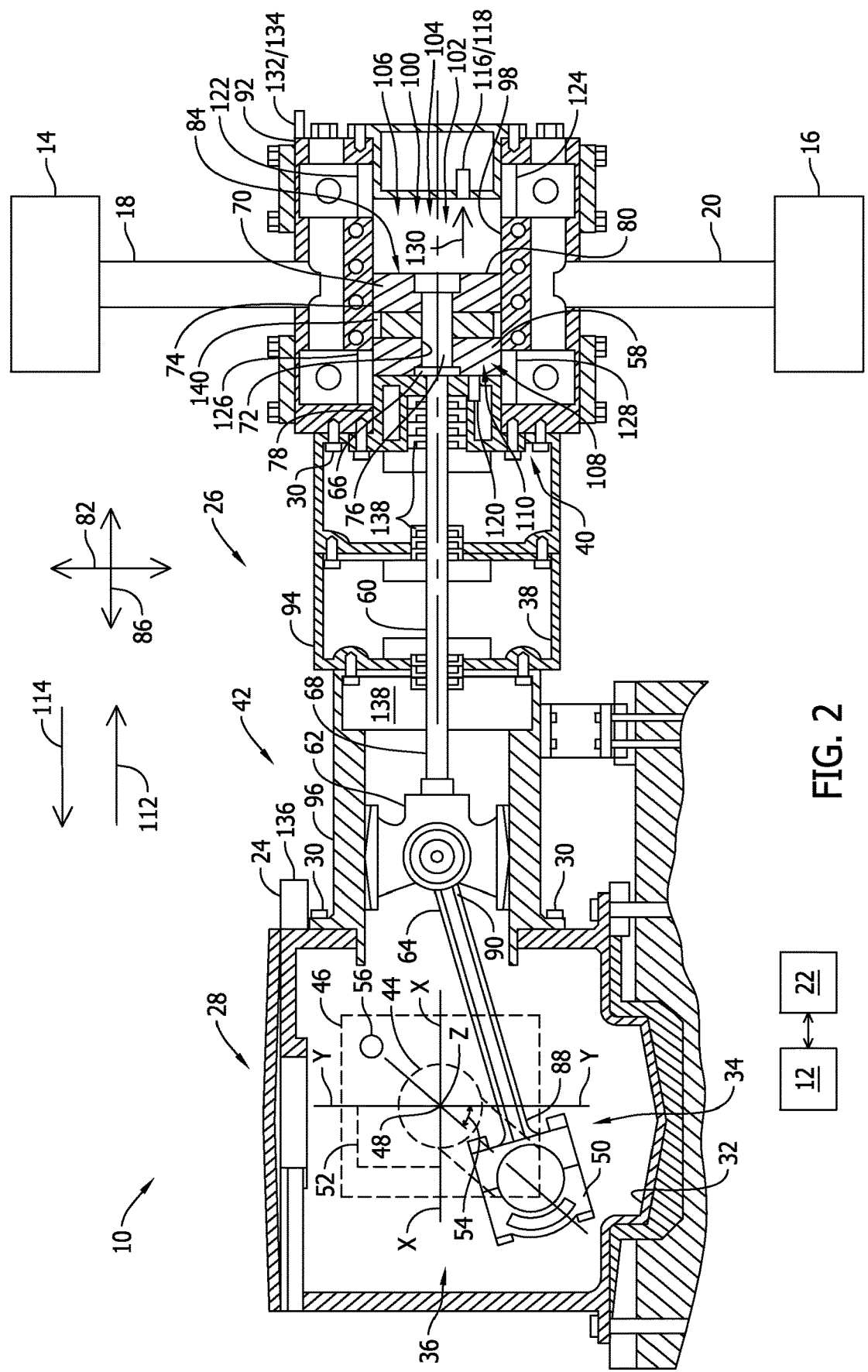

FIG. 1 is a schematic illustration of an exemplary reciprocating compressor 10 including a condition monitoring system 12. FIG. 2 is a cross-sectional view of reciprocating compressor 10 taken along line 2-2. In the exemplary embodiment, reciprocating compressor 10 can be coupled in flow communication between a gas source 14 and an output assembly 16. Reciprocating compressor 10 can receive a flow of fluid such as, for example a gas or a gas mixture, can compress the gas to a higher pressure and a lower volume, and can discharge the compressed gas to output assembly 16. In the exemplary embodiment, one or more fluid inlet conduits 18 can be coupled between gas source 14 and reciprocating compressor 10 for channeling gas from gas source 14 to reciprocating compressor 10. Moreover, one or more fluid outlet conduits 20 can be coupled between reciprocating compressor 10 and output assembly 16 for channeling compressed gas from reciprocating compressor 10 to output assembly 16.

In the exemplary embodiment, condition monitoring system 12 can be coupled to reciprocating compressor 10 for monitoring reciprocating compressor 10. More specifically, condition monitoring system 12 can be coupled to reciprocating compressor 10 to enable monitoring of forces acting on the piston, piston position, and cylinder pressure on the head end and crank end. Condition monitoring system 12 can include a protection system 22 that can be coupled in communication with a plurality of sensors 24 (communication conduits not shown for clarity). Each sensor 24 can detect various conditions of reciprocating compressor 10. Sensors 24 may include, but are not limited to only including, position sensors, temperature sensors, flow sensors, acceleration sensors, pressure sensors, and/or any other sensors that sense various parameters relative to the operation of reciprocating compressor 10. As used herein, the term "parameters" includes physical properties whose values can be used to define the operating conditions of reciprocating compressor 10, such as vibrations, pressures, and fluid flows at defined locations.

In the exemplary embodiment, reciprocating compressor 10 can include at least one cylinder assembly 26 that can be coupled to a compressor frame 28. A plurality of fastener assemblies 30 can couple cylinder assembly 26 to compressor frame 28. In the exemplary embodiment, compressor frame 28 can include an inner surface 32 that can define a cavity 34 therein. A crankshaft assembly 36 coupled to compressor frame 28 can be positioned within cavity 34. Cylinder assembly 26 can extend outwardly from compressor frame 28 and can include an inner surface 38 that can define a cylinder cavity 40. A piston assembly 42 can be positioned within cylinder cavity 40 and can be coupled to crankshaft assembly 36. Crankshaft assembly 36 can include a crankshaft 44 that can be rotatably coupled to a motor 46. Motor 46 can be configured to rotate crankshaft 44 about an axis of rotation 48 and protection system 22 can control an operation of motor 46.

In the exemplary embodiment, crankshaft 44 can include at least one crank pin 50 that can extend substantially radially outwardly from crankshaft 44. More specifically, in the exemplary embodiment, three perpendicular axes X, Y, and Z extend through crankshaft 44 to define a three-dimensional Cartesian coordinate system relative to crankshaft 44 such that the Z-axis can be substantially coaxial with axis of rotation 48, and such that the X-axis and the Y-axis intersect to form a rotational plane 52 of crank pin 50. A crank angle α can be defined between crank pin 50 and Y-axis. Crankshaft 44 can be configured to rotate crank pin 50 about axis 48 between a crank angle α of about 0° to about 360°. At least one position sensor 56 can be coupled to compressor frame 28 for sensing a position of crank pin 50 with respect to Y-axis and for transmitting a signal indicative of the sensed position to protection system 22. In one embodiment, position sensor 56 can include a multi-event wheel for use in sensing a position of crank pin 50 with respect to Y-axis.

In the exemplary embodiment, piston assembly 42 can include a piston head 58, a piston rod 60 that can be coupled to piston head 58, a crosshead 62 that can be coupled to piston rod 60, and a connecting rod 64 that can be coupled between crosshead 62 and crank pin 50. Piston rod 60 can include a centerline axis 68 that can extend from a first end 66 to a second end 67. Piston assembly 42 can be coupled to crankshaft assembly 36 such that axis of rotation 48 can be oriented substantially perpendicular to centerline axis 68. Piston head 58 can include an annular piston head body 70 that can include a radially inner surface 72 and a radially outer surface 74. Radially inner surface 72 can define an inner cylindrical cavity 76 that can extend generally axially through piston head body 70 along centerline axis 68. Inner cylindrical cavity 76 can be substantially cylindrical in shape and can be sized to receive piston rod 60 therein.

Piston head 58 also can include a crank end surface 78 and an opposite head end surface 80. Crank end surface 78 can be positioned closer to crankshaft 44 than head end surface 80. Each end surface 78 and 80 can extend generally radially between radially inner surface 72 and radially outer surface 74 in a direction that can be that can be generally perpendicular to centerline axis 68. Each end surface 78 and 80 can include a working surface area 84 that can extend between surface 72 and surface 74.

In the exemplary embodiment, piston assembly 42 translates a rotation of crankshaft 44 about axis 48 into a linear movement of piston head 58 along centerline axis 68. Piston rod 60 can be coupled between crosshead 62 and piston head 58, and can be oriented to move piston head 58 along centerline axis 68. Connecting rod 64 can extend between crosshead 62 and crank pin 50 and can include a first end 88 and a second end 90. First end 88 can be coupled to crank pin 50 and can be pivotable with respect to crank pin 50, as crank pin 50 rotates about axis 48. Second end 90 can be coupled to crosshead 62 and can be pivotable with respect to crosshead 62. During operation, as crankshaft 44 rotates about axis 48, connecting rod 64 pivots with respect to crosshead 62 and can move crosshead 62 along centerline axis 68. Crosshead 62, in turn, can move piston rod 60 and piston head 58 longitudinally along centerline axis 68. As crankshaft 44 can be rotated through a full rotation from crank angle α from 0° to 360°, piston head 58 can be reciprocated along centerline axis 68. A complete compressor operation cycle of reciprocating compressor 10 can include a full rotation between crank angle α of 0° to 360°.

In the exemplary embodiment, cylinder assembly 26 can include a cylinder head 92, a distance piece 94, and a crosshead guide 96. Fastener assemblies 30 can be coupled between cylinder head 92, distance piece 94, and crosshead guide 96 to facilitate coupling cylinder head 92, distance piece 94, and crosshead guide 96 together. Distance piece 94 can extend between cylinder head 92 and crosshead guide 96. Crosshead guide 96 can be coupled to compressor frame 28 for supporting cylinder assembly 26 from compressor frame 28. Cylinder head 92 can include an inner surface 98 that can define a cavity 100. Piston head 58 can be positioned within, and can be movable within, cavity 100 along centerline axis 68. Head end surface 80 can at least partially define a first chamber 104, e.g., a head end (HE) chamber that can extend between head end surface 80 and inner surface 98. Crank end surface 78 can define a second chamber 108, e.g., a crank end (CE) chamber that can extend between crank end surface 78 and inner surface 98. Piston rod 60 can extend outwardly from piston head 58 and can be positioned with distance piece 94. Crosshead 62 can be coupled to piston rod 60 and can be positioned within crosshead guide 96.

In the exemplary embodiment, piston assembly 42 can be moveable in a reciprocating motion along centerline axis 68 between a compression stroke 112 (represented by an arrow), and a tension stroke 114 (represented by an arrow). During compression stroke 112, piston head 58 can move outwardly from crankshaft 44 such that HE chamber 104, e.g. an HE volume, can be reduced and such that chamber 108, e.g. a CE volume, can be increased. During tension stroke 114, piston head 58 can move inwardly towards crankshaft 44 such that the HE chamber volume can be increased and such that CE chamber volume can be reduced. At least one pressure sensor 116 can be coupled to cylinder assembly 26 for use in sensing a pressure within HE chamber 104 and/or CE chamber 108. Pressure sensor 116 can transmit a signal indicative of fluid pressure to protection system 22. In the exemplary embodiment, condition monitoring system 12 can include a first pressure sensor 118 and a second pressure sensor 120. First pressure sensor 118 can be coupled to HE chamber 104 for sensing a pressure within HE chamber 104, and second pressure sensor 120 can be coupled to CE chamber 108 for sensing a pressure within CE chamber 108.

In the exemplary embodiment, cylinder head 92 can include an HE suction valve 122 and a HE discharge valve 124. HE suction valve 122 can be coupled in flow communication between HE chamber 104 and fluid inlet conduit 18 for regulating a flow of gas from gas source 14 to HE chamber 104. HE suction valve 122 can be movable between an open position that can enable gas to be channeled from gas source 14 to HE chamber 104, and a closed position that can prevent gas from being channeled from gas source 14 to HE chamber 104. HE discharge valve 124 can be coupled in flow communication between HE chamber 104 and fluid outlet conduit 20 for regulating a flow of compressed gas from HE chamber 104 to output assembly 16. HE discharge valve 124 can be movable between an open position that can enable gas to be discharged from HE chamber 104 to output assembly 16 and a closed position that can prevent gas from being discharged from HE chamber 104 to output assembly 16. HE suction valve 122 can move to the open position when a pressure within HE chamber 104 can be at a first predefined pressure, and can move to the closed position when the pressure within HE chamber 104 can be above the first pressure. HE discharge valve can move to the open position when the pressure within HE chamber can be at a second predefined pressure that can be higher than the first pressure, and can move to the closed position when the pressure can be below the second pressure.

Cylinder head 92 also can include a CE suction valve 126 and a CE discharge valve 128. CE suction valve 126 can be coupled in flow communication between CE chamber 108 and fluid inlet conduit 18 for regulating a flow of gas from gas source 14 to CE chamber 108. CE suction valve 126 can be movable between an open position that can enable gas to be channeled from gas source 14 to CE chamber 108 and a closed position that can prevent gas from being channeled from gas source 14 to CE chamber 108. CE discharge valve 128 can be coupled in flow communication between CE chamber 108 and fluid outlet conduit 20 for regulating a flow of compressed gas from CE chamber 108 to output assembly 16. CE discharge valve 128 can be movable between an open position that can enable gas to be discharged from CE chamber 108 to output assembly 16 and a closed position that can prevent gas from being discharged from CE chamber 108 to output assembly 16. CE suction valve 126 can move to the open position when a pressure within CE chamber 108 can be at a third predefined pressure, and can move to the closed position when the pressure within CE chamber 108 can be above the third pressure. CE discharge valve 128 can move to the open position when the pressure within CE chamber 108 can be at a fourth predefined pressure that can be greater than the third pressure, and can move to the closed position when the pressure within CE chamber 108 can be below the fourth pressure.

During operation of reciprocating compressor 10, HE suction valve 122 and HE discharge valve 124 can be operated to maintain a pressure within HE chamber 104 between the first and second pressures. As piston assembly 42 moves through tension stroke 114, HE suction valve 122 and HE discharge valve can be closed such that pressure within HE chamber 104 can be reduced from the second pressure to the first pressure as the HE chamber volume is increased. At the first pressure, HE suction valve 122 can move to the open position to enable a flow of gas to be channeled into HE chamber 104 from gas source 14. As gas is channeled into HE chamber 104, piston assembly 42 can move through tension stroke 114 towards a first rod reversal event. During the first rod reversal event, piston assembly 42 can reverse direction along centerline axis 68 from tension stroke 114 to compression stroke 112. During compression stroke 112, pressure within HE chamber 104 is increased from the first pressure to the second pressure. As the pressure within HE chamber 104 is increased above the first pressure, HE suction valve 122 can move to the closed position to prevent gas from being channeled from gas source 14 to HE chamber 104. During compression stroke 112, the HE chamber volume is reduced to facilitate compressing gas within HE chamber 104. At second pressure, HE discharge valve 124 can move to the open position to enable compressed gas to be discharged from HE chamber 104 to output assembly 16 as piston assembly 42 can move through compression stroke 112 towards a second rod reversal event. During the second rod reversal event, piston assembly 42 can reverse direction along centerline axis 68 from compression stroke 112 to tension stroke 114.

Similarly, CE suction valve 126 and CE discharge valve 128 can be operated to maintain a pressure within CE chamber 108 between the third and fourth pressures. As piston assembly 42 can move through compression stroke 112, CE suction valve 126 and CE discharge valve 128 can be closed such that pressure within CE chamber 108 is reduced from the fourth pressure to the third pressure. At the third pressure, CE suction valve 126 can be opened to enable a flow of gas to be channeled into CE chamber 108 from gas source 14. As piston assembly 42 can move through the first rod reversal event to tension stroke 114, pressure within CE chamber 108 is increased from the third pressure to the fourth pressure. As the pressure within CE chamber 108 is increased above the third pressure, CE suction valve 126 can be closed to prevent gas from being channeled from gas source 14 to CE chamber 108, and to enable piston head 58 to compress gas within CE chamber 108. At fourth pressure, CE discharge valve 128 can be opened to enable compressed gas to be discharged from CE chamber 108 to output assembly 16 as piston assembly 42 moves towards the second rod reversal event.

Moreover, during operation of reciprocating compressor 10, as piston head 58 compresses gas within HE chamber 104, the compressed gas can impart a gas force, represented by arrow 130, against cylinder head 92. As used herein, the term "gas force" includes an amount of force applied against cylinder head 92 by gas when piston head 58 is compressing the gas within HE chamber 104 and/or CE chamber 108. Gas force 130 acting upon cylinder head 92 can be approximately equal to the sum of the gas force acting upon crank end surface 78 of piston head 58 and the gas force acting upon the head end surface 80 of piston head 58. The gas force acting on the head end surface 80 is approximately equal to working surface area 84 of head end surface 80 multiplied by the pressure within HE chamber 104. The gas force acting upon crank end surface 78 of piston head 58 is approximately equal to working surface area 84 of crank end surface 78 multiplied by the pressure within CE chamber 108.

During operation, reciprocating compressor 10, cylinder assembly 26 and compressor frame 28 can be subjected to various forces, i.e. gas compression loads and/or rotational loads that cause cylinder assembly 26 and compressor frame 28 to oscillate and/or generate a vibration. More specifically, as piston assembly 42 is moved through a compression stroke 112 and a tension stroke 114, cylinder assembly 26 and compressor frame 28 oscillate along centerline axis 68. Over time, the oscillations and/or vibrations may increase mechanical wear in cylinder assembly 26, compressor frame 28, and/or fastener assemblies 30. During normal operation, reciprocating compressor 10 generally can operate within a predefined range of displacement values, based on structural characteristics of cylinder assembly 26 and compressor frame 28. Over time, as reciprocating compressor 10 can be subjected to general mechanical wear, fastener assemblies 30 may become loose and/or structural fatigue may develop within fastener assemblies 30. Such fatigue may cause reciprocating compressor 10 to operate with displacement values that can be not within the predefined range of displacement values. In addition, the wear of seals 138 and rings 140 may cause leakage and instability in the travel of the piston in the cylinder. Condition monitoring system 12 can be configured to monitor the process parameter values of reciprocating compressor 10 and to notify an operator when reciprocating compressor 10 is not operating within a predefined range of values. In one embodiment, condition monitoring system 12 can operate motor 46 to modulate a rotational velocity of crankshaft 44 and/or shut-down an operation of reciprocating compressor 10 when a monitored parameter is different than a predefined value for that parameter.

In the exemplary embodiment, condition monitoring system 12 can include at least one vibration sensor 132 that can be coupled to cylinder assembly 26 for sensing a displacement of cylinder assembly 26 along centerline axis 68. In the exemplary embodiment, condition monitoring system 12 can include a first vibration sensor 134 and a second vibration sensor 136. First vibration sensor 134 can be coupled to cylinder assembly 26 for sensing seismic acceleration of reciprocating compressor 10 and for transmitting a signal indicative of the sensed acceleration to protection system 22. In this embodiment, first vibration sensor 134 can sense an acceleration of reciprocating compressor 10 along centerline axis 68. Second vibration sensor 136 can be coupled to compressor frame 28 for sensing seismic acceleration of compressor frame 28 and for transmitting a signal indicative of the sensed acceleration to protection system 22. Second vibration sensor 136 can sense an acceleration of compressor frame 28 along centerline axis 68.

Figure 3:
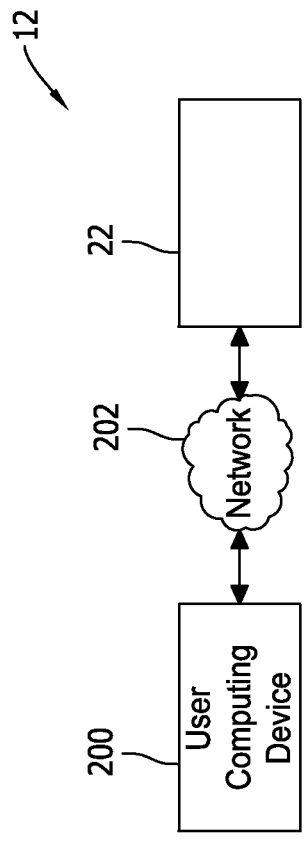

FIG. 3 is a block diagram of condition monitoring system 12 (shown in FIG. 1). In the exemplary embodiment, condition monitoring system 12 can include a user computing device 200 that can be coupled to protection system 22 via a network 202. Network 202 may include, but is not limited to, the Internet, a local area network (LAN), a wide area network (WAN), a wireless LAN (WLAN), a mesh network, and/or a virtual private network (VPN). User computing device 200 and protection system 22 communicate with each other and/or network 202 using a wired network connection (e.g., Ethernet or an optical fiber), a wireless communication means, such as radio frequency (RF), an Institute of Electrical and Electronics Engineers (IEEE) 802.11 standard (e.g., 802.11(g) or 802.11(n)), the Worldwide Interoperability for Microwave Access (WIMAX) standard, a cellular phone technology (e.g., the Global Standard for Mobile communication (GSM)), a satellite communication link, and/or any other suitable communication means. WIMAX is a registered trademark of WiMax Forum, of Beaverton, Oreg. IEEE is a registered trademark of Institute of Electrical and Electronics Engineers, Inc., of New York, N.Y.

Figure 4:
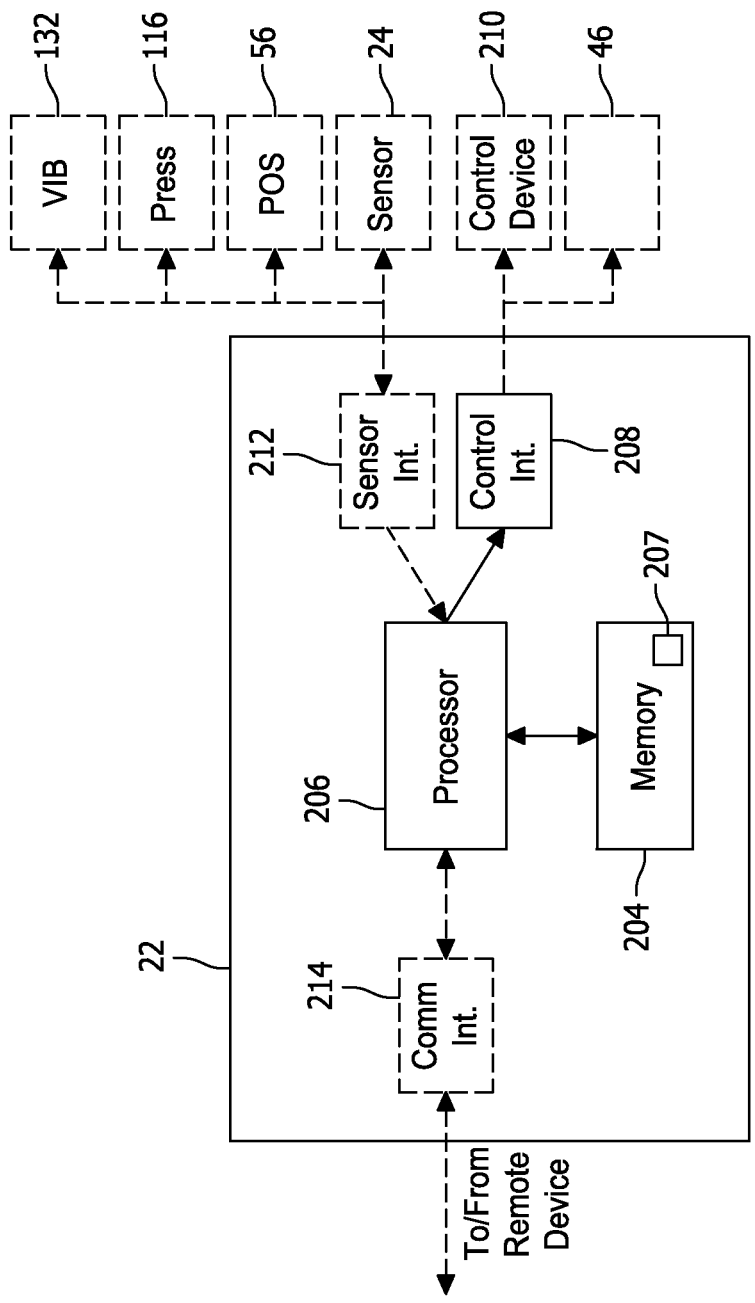

FIG. 4 is a block diagram of protection system 22 (shown in FIG. 1). In the exemplary embodiment, protection system 22 can be a real-time controller that can include any suitable processor-based or microprocessor-based system, such as a computer system, that can include microcontrollers, reduced instruction set circuits (RISC), application-specific integrated circuits (ASICs), logic circuits, and/or any other circuit or processor that is capable of executing the functions described herein. In one embodiment, protection system 22 may be a microprocessor that can include read-only memory (ROM) and/or random access memory (RAM), such as, for example, a 32 bit microcomputer with 2 Mbit ROM and 64 Kbit RAM. As used herein, the term "real-time" includes outcomes occurring at a substantially short period of time after a change in the inputs affect the outcome, with the time period being a design parameter that may be selected based on the importance of the outcome and/or the capability of the system processing the inputs to generate the outcome.

In the exemplary embodiment, protection system 22 can include a memory device 204 that can store executable instructions and/or one or more operating parameters representing and/or indicating an operating condition of reciprocating compressor 10. Operating parameters may represent and/or indicate, without limitation, a vibration frequency, a vibration amplitude, a vibration phase, a fluid pressure, a rotational position, a linear position, a temperature, a flow rate, and/or a displacement. In one embodiment, memory device 204 can store a predefined range of operating parameter values that can be received from user computing device 200. In the exemplary embodiment, protection system 22 also can include a processor 206 that can be coupled to memory device 204 and that can be programmed to calculate a condition of reciprocating compressor 10 based at least in part on one or more operating parameters. For example, processor 206 also can calculate a condition of reciprocating compressor 10 based on the predefined range of operating parameter values. In one embodiment, processor 206 may include a processing unit, such as, without limitation, an integrated circuit (IC), an application specific integrated circuit (ASIC), a microcomputer, a programmable logic controller (PLC), and/or any other programmable circuit. Alternatively, processor 206 may include multiple processing units (e.g., in a multi-core configuration). In other embodiments, memory device 204 can store a model 207 of reciprocating compressor 10. Model 207 can be a physics model, a thermodynamic model, or other representation of reciprocating compressor 10 or a portion thereof. Model 207 can be formed of a plurality of modules, each module representing a different portion of reciprocating compressor 10 or representing portions of reciprocating compressor 10 that overlap other portions of reciprocating compressor 10. Some of these modules may be stored in other memory devices or stored remotely and are accessed when needed to perform a specific or selected analysis.

In the exemplary embodiment, processor 206 can be programmed to calculate an operating parameter value of reciprocating compressor 10 based at least in part on a vibration signal that can be received from vibration sensor 132 and a pressure signal that can be received from pressure sensor 116. Processor 206 also can compare the calculated operating parameter value to the predefined parameter value to determine if a condition of reciprocating compressor 10 is outside the predefined reciprocating compressor 10 condition range.

In the exemplary embodiment, protection system 22 also can include a control interface 208 that can control an operation of reciprocating compressor 10 based at least in part on a calculated condition of reciprocating compressor 10. In some embodiments, control interface 208 can be coupled to one or more reciprocating compressor control devices 210, such as, for example, motor 46 (shown in FIG. 2).

In the exemplary embodiment, protection system 22 can include a sensor interface 212 that can be coupled to at least one sensor 24 such as, for example, position sensor 56, pressure sensor 116, and/or vibration sensor 132, for receiving signals from sensor 24. Each sensor 24 can transmit a signal corresponding to a sensed operating parameter of reciprocating compressor 10. Moreover, each sensor 24 may transmit a signal continuously, periodically, or only once, for example, although, other signal timings are also contemplated. Furthermore, each sensor 24 may transmit a signal either in an analog form or in a digital form. Protection system 22 can process the signal(s) using processor 206 to create one or more operating parameters. In some embodiments, processor 206 can be programmed (e.g., with executable instructions in memory device 204) to sample a signal produced by sensor 24. For example, processor 206 may receive a continuous signal from sensor 24 and, in response, periodically (e.g., once every five seconds) calculate a condition of reciprocating compressor 10 based on the continuous signal. In some embodiments, processor 206 normalizes a signal received from sensor 24. For example, sensor 24 may produce an analog signal with a parameter (e.g., voltage) that is directly proportional to an operating parameter value. Processor 206 may be programmed to convert the analog signal to the operating parameter. In one embodiment, sensor interface 212 can include an analog-to-digital converter that converts an analog voltage signal generated by sensor 24 to a multi-bit digital signal usable by protection system 22.

In the exemplary embodiment, protection system 22 can include a communication interface 214. Communication interface 214 can be coupled in communication with one or more remote devices, such as user computing device 200. Communication interface 214 may transmit an operating parameter and/or a control parameter (e.g., a rotational velocity) to a remote device. For example, communication interface 214 may encode an operating parameter and/or a control parameter in a signal. In addition communication interface 214 can receive the operating parameter and/or the control parameter from a remote device and protection system 22 may control an operation of reciprocating compressor 10 based at least in part on the received operating parameter and/or control parameter.

Various connections can be available between control interface 208 and control device 210, and between sensor interface 212 and sensor 24. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside reciprocating compressor 10) network connection, whether wired or wireless.

Figure 5:
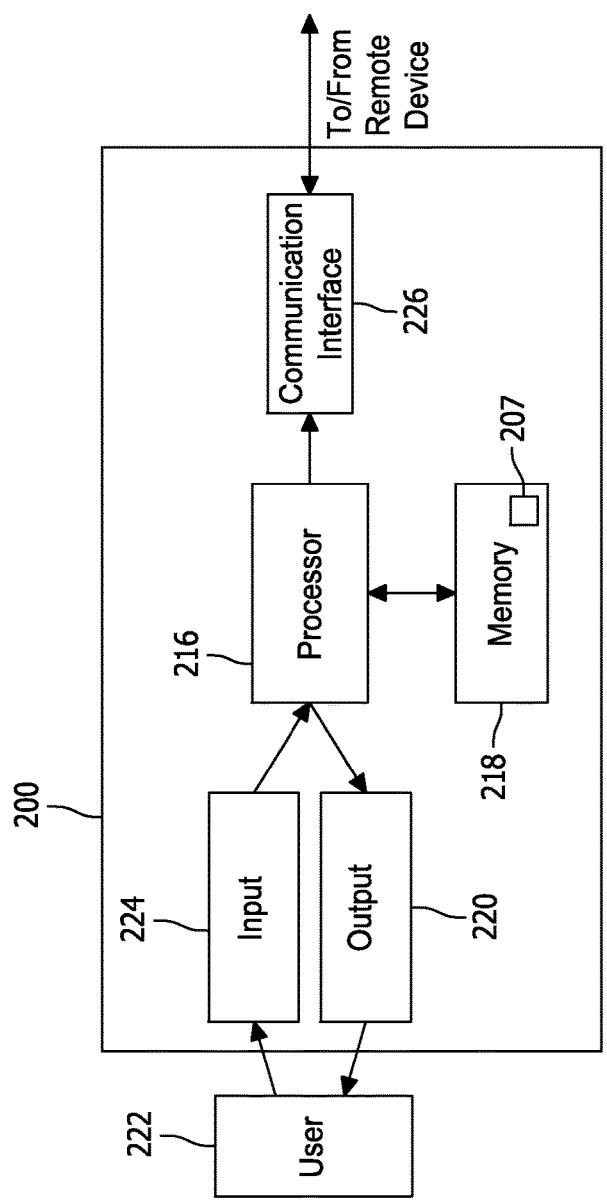

FIG. 5 is a block diagram of user computing device 200 (shown in FIG. 3). In the exemplary embodiment, user computing device 200 can include a processor 216 for executing instructions. In some embodiments, executable instructions can be stored in a memory device 218. Processor 216 may include one or more processing units (e.g., in a multi-core configuration). Memory device 218 can be any device allowing information, such as executable instructions and/or other data, to be stored and retrieved. For example, memory device 218 can store model 207 or modules that form a portion of model 207. Others of these modules may be stored in other memory devices, such as, but not limited to, memory device 204 or may be stored remotely and are accessed when needed to perform a specific or selected analysis.

User computing device 200 also can include at least one output component 220 for use in presenting information to a user 222. Output component 220 can be any component capable of conveying information to user 222. Output component 220 may include, without limitation, a display device (e.g., a liquid crystal display (LCD), an organic light emitting diode (OLED) display, or an audio output device (e.g., a speaker or headphones).

In some embodiments, user computing device 200 can include an input component 224 for receiving input from user 222. Input component 224 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of output component 220 and input component 224. User computing device 200 also can include a communication interface 226, which can be communicatively coupled to network 202 and/or protection system 22.

During operation of reciprocating compressor 10, protection system 22 can receive signals indicative of a rotational position of crankshaft 44 from position sensor 56. Protection system 22 can calculate crank angle α based at least in part on the rotational position of crankshaft 44. In the exemplary embodiment, protection system 22 can calculate crank angle α at 0.5° intervals. Alternatively, protection system 22 can calculate crank angle α at any suitable interval sufficient to enable condition monitoring system 12 to function as described herein.

In the exemplary embodiment, protection system 22 can receive signals indicative of a pressure of fluid within cylinder head 92 from pressure sensor 116. Protection system 22 can calculate gas force 130 acting upon piston head 58 based at least in part on the received signals from pressure sensor 116. In one embodiment, protection system 22 can calculate the gas force acting upon cylinder head 92 by multiplying the sensed pressure by working surface area 84 of piston head 58. In addition, protection system 22 can calculate gas force 130 at each calculated crank angle α.

In one embodiment, protection system 22 can receive signals indicative of a pressure within HE chamber 104 from first pressure sensor 118, and can calculate a gas force acting upon head end surface 80 of piston head 58 based at least in part on the received signals from first pressure sensor 118. In addition, protection system 22 can receive signals indicative of a pressure within CE chamber 108 from second pressure sensor 120, and can calculate a gas force acting upon crank end surface 78 of piston head 58 based at least in part on the received signals from first pressure sensor 118. In this embodiment, protection system 22 can calculate gas force 130 by adding the calculated gas force acting upon crank end surface 78 and the gas force acting upon head end surface 80.

In the exemplary embodiment, protection system 22 can receive signals indicative of an acceleration of cylinder assembly 26 along centerline axis 68 from vibration sensor 132. Protection system 22 can calculate a displacement value of cylinder assembly 26 along centerline axis 68 based at least in part on the sensed acceleration of cylinder assembly 26. In addition, protection system 22 can calculate the displacement value of cylinder assembly 26 at each calculated crank angle α.

In one embodiment, protection system 22 can receive signals indicative of an acceleration of reciprocating compressor 10 along centerline axis 68 from first vibration sensor 134, and can receive signals indicative of an acceleration of compressor frame 28 along centerline axis 68 from second vibration sensor 136. Protection system 22 can calculate a displacement value of cylinder assembly 26 along centerline axis 68 based at least in part on the sensed acceleration of reciprocating compressor 10 and the sensed acceleration of compressor frame 28. More specifically, protection system 22 can calculate the displacement value of cylinder assembly 26 based at least in part on the difference between the sensed acceleration of reciprocating compressor 10 and the sensed acceleration of compressor frame 28. In addition, protection system 22 can calculate the displacement value of cylinder assembly 26 at each calculated crank angle α.

In the exemplary embodiment, protection system 22 can determine that a condition of reciprocating compressor 10 is less than a predefined reciprocating compressor condition, after determining that the calculated parameter value of cylinder assembly 26 is different than a predefined parameter value. Protection system 22 also can transmit a notification signal to user computing device 200 after determining that a monitored condition of reciprocating compressor is less than a predefined reciprocating compressor condition. User computing device 200 can display a notification to user 222 with communication interface 214 after receiving the notification signal from protection system 22. In one embodiment, protection system 22 can operate motor 46 to modulate a rotational velocity of crankshaft 44 after determining that the calculated parameter value of cylinder assembly 26 is different than a predefined parameter value. In another alternative embodiment, protection system 22 can operate motor 46 to shut-down an operation of reciprocating compressor 10 after determining that the calculated parameter value of cylinder assembly 26 is different than a predefined parameter value.

In an alternative embodiment, protection system 22 can calculate a first gas force acting upon cylinder head 92 at a calculated first crank angle α in a first compressor operation cycle. Protection system 22 also can calculate a first displacement value of cylinder assembly 26 at the first calculated crank angle α in the first compressor operation cycle.

In one embodiment, protection system 22 can calculate a range of gas force values acting upon cylinder head 92 in a first complete compressor operation cycle. Protection system 22 also can calculate an array of gas force values based at least in part on the calculated range of gas force values. Protection system 22 can calculate a range of displacement values of cylinder assembly 26 in the first complete compressor operation cycle. Protection system 22 also can calculate an array of displacement values based at least in part on the calculated range of displacement values.

In another alternative embodiment, protection system 22 can calculate an array range of gas force values acting upon cylinder head 92 at a plurality of calculated crank angles. Protection system 22 also can calculate an array of displacement values of cylinder assembly 26 at the plurality of calculated crank angles. In this embodiment, protection system 22 can calculate an array of parameter values within a predefined range of calculated crank angles based at least in part on the calculated array of gas force values divided by the calculated array of displacement values.

Figure 6:
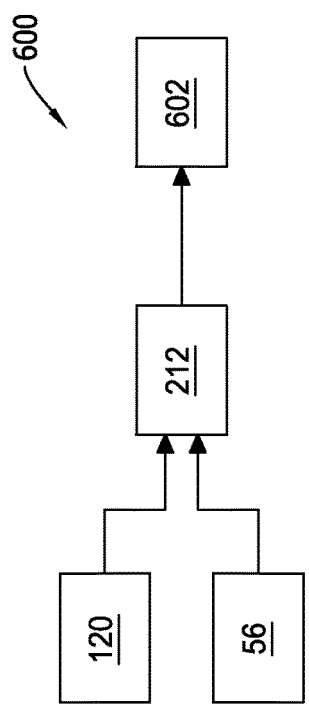

FIG. 6 is a schematic block diagram of a sensor channel 600 that may be used with condition monitoring system 12 and/or protection system 22 (both shown in FIG. 1). In the exemplary embodiment, sensor channel 600 can include a first sensor 24, such as a cylinder crank end (CE) pressure sensor 120, a second sensor 24, such as, a position sensor 56 configured to generate a signal indicative of a rotational position of crankshaft 44. Sensor interface 212 can receive respective signals from sensors 56 and 120 and can transmit the signals downstream for further processing. In some embodiments, the signals may be scaled and/or converted to a different form, for example, from an analog signal to a digital signal. The signals can be further processed to normalize and combine them for display and/or analysis by a machinery analysis system 602. Machinery analysis system 602 may be configured as a portion of condition monitoring system 12 or protection system 22, or may be configured as a standalone system independent, but in communication with condition monitoring system 12 and/or protection system 22.

Figure 7:
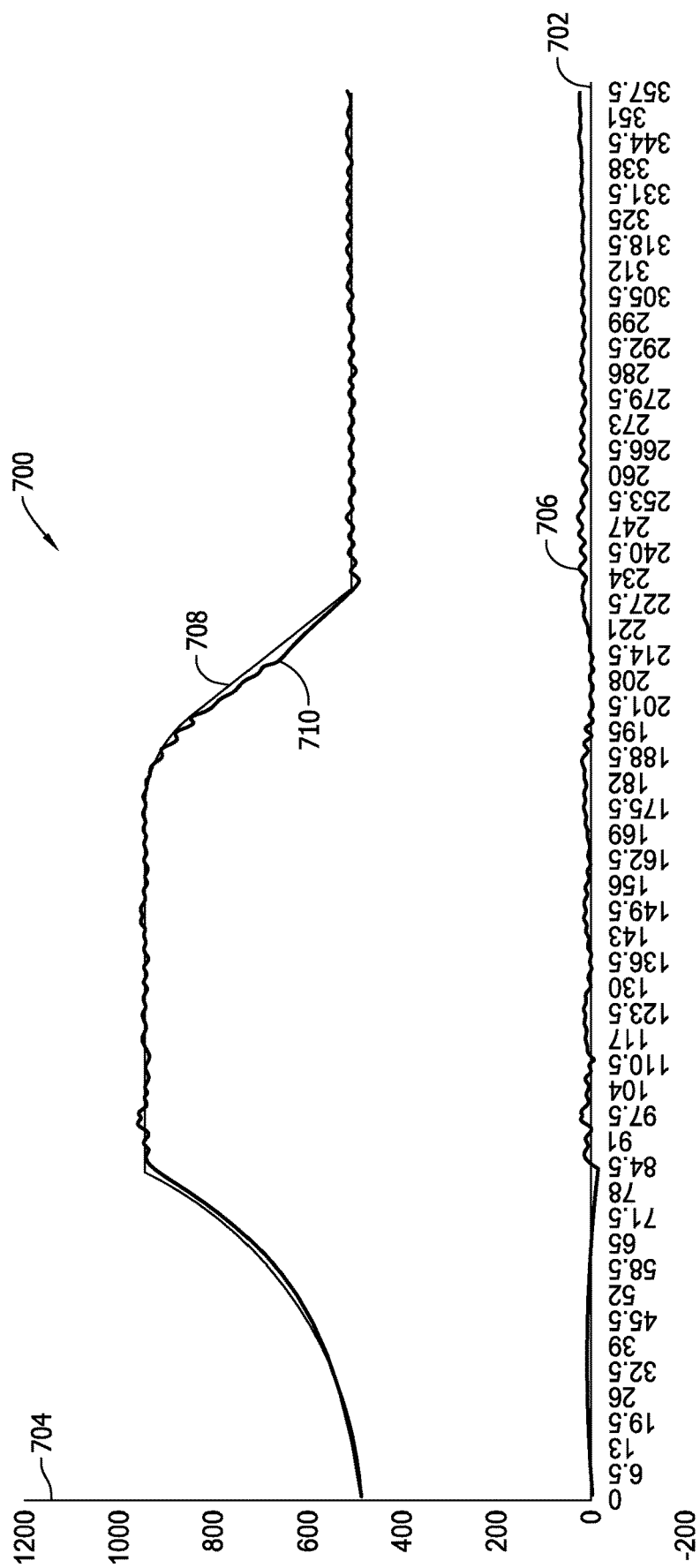

FIG. 7 is a graph 700 of crank end pressure versus crank angle α during an exemplary complete compressor operation cycle of reciprocating compressor 10 (shown in FIG. 1). Graph 700 includes an x-axis 702 graduated in units of rotational position, for example, degrees and a y-axis 704 graduated in units of pressure. A trace 710 illustrates the raw crank end pressure data acquired at each increment of rotational position. A trace 708 illustrates an ideal curve or adiabatic curve that can be calculated at each increment of rotational position. Typically, an adiabatic curve for a process represents the process with no heat transfer in to or out of the system being evaluated. In this case, the ideal or adiabatic curve represents an ideal performance of reciprocating compressor 10. The adiabatic curve can be calculated using a model of reciprocating compressor 10. In some embodiments, the model can be a physics model, a thermodynamic model, or other representation of reciprocating compressor 10. In some embodiments, inputs for the model include parameters known by condition monitoring system 12 and protection system 22 that can be coupled in communication with plurality of sensors 24. In some embodiments, inputs from only a portion of sensors 24 can be used determine the adiabatic curve. The sensor inputs provide values for variables of the algorithm used to determine the adiabatic or ideal curve of the reciprocating compressor. In some embodiments, only a portion of the reciprocating compressor is modeled, for example, example a single cylinder. In other embodiments, the entire reciprocating compressor is model and analyzed. In the exemplary embodiment, a trace 706 illustrates the raw crank end pressure data acquired at each increment of rotational position normalized to the adiabatic curve that can be calculated at each increment of rotational position. Trace 706 improves an ability to diagnose conditions of reciprocating compressor 10 operation that are abnormal and that may need remediation by an operator, condition monitoring system 12, and/or protection system 22. Although illustrated using the crank end pressure parameter of reciprocating compressor 10, any of the monitored parameters of reciprocating compressor 10 or other machinery may be analyzed using the above described method.

Figure 8:
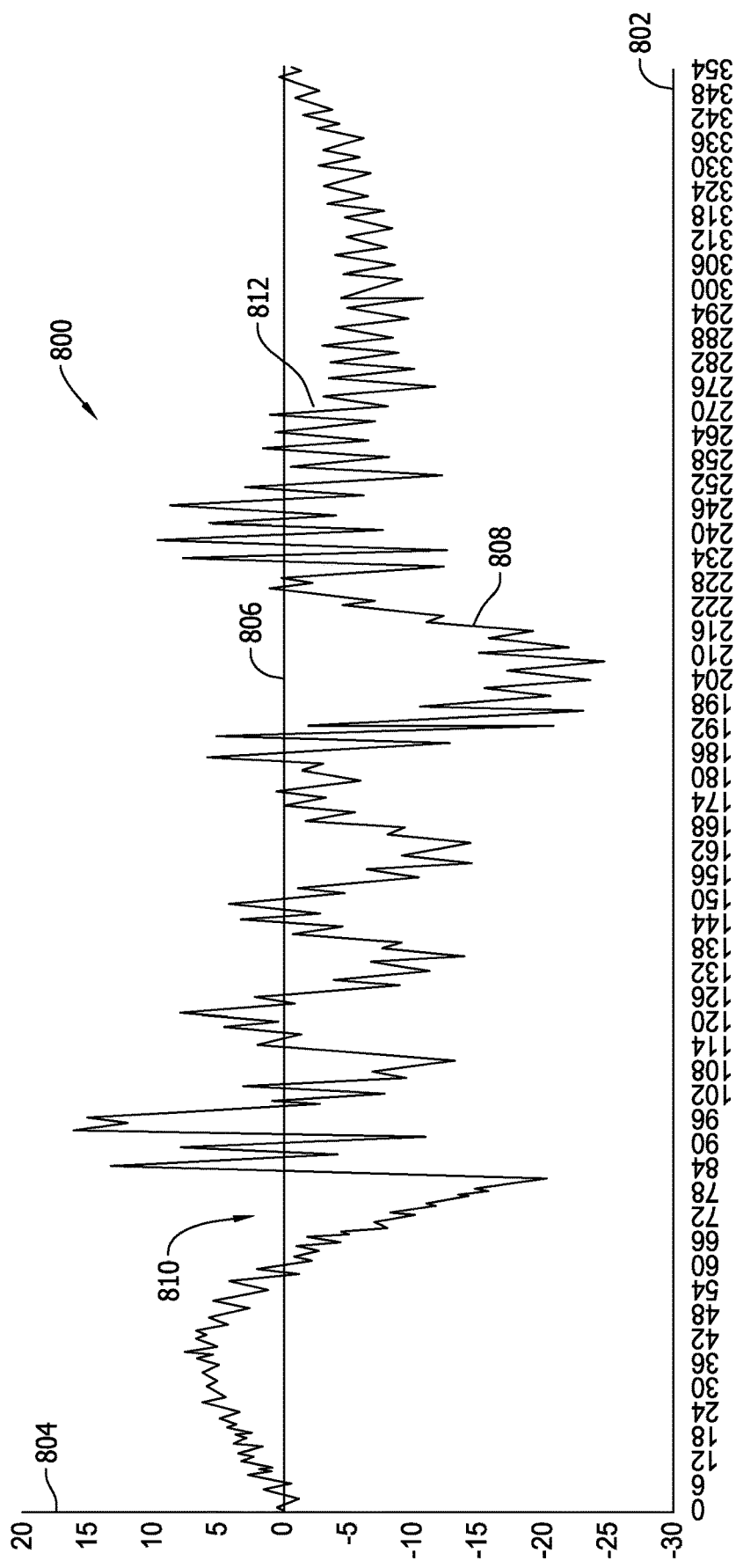

FIG. 8 is a graph 800 of another representation of graph 700 (shown in FIG. 7) that shows only the normalized raw data with respect to the adiabatic curve at a smaller scale. Graph 800 includes an x-axis 802 graduated in units of rotational position, for example, degrees and a y-axis 804 graduated in units of normalized pressure. A trace 806 illustrates the adiabatic curve (shown in FIG. 7) that can be calculated at each increment of rotational position. A trace 808 illustrates the raw crank end pressure data acquired at each increment of rotational position normalized to the adiabatic curve that can be calculated at each increment of rotational position. The accentuated difference between traces 806 and 808 relate to anomalies in the operation of reciprocating compressor 10 that can be diagnosed visually by, for example, a human expert or may be analyzed using a processor executing instructions for characterizing the differences and correlating the analyzed characterization to known characterizations associated with known anomalies. For example, a sudden swing in compression as shown at trace portion 810 may indicate a possible piston leak. Depending on a severity of the leak, corrective action may be alerted to an operator. In another example, port resonance may also be indicated over the entire curve and particularly at trace portion 812.

Figure 9:
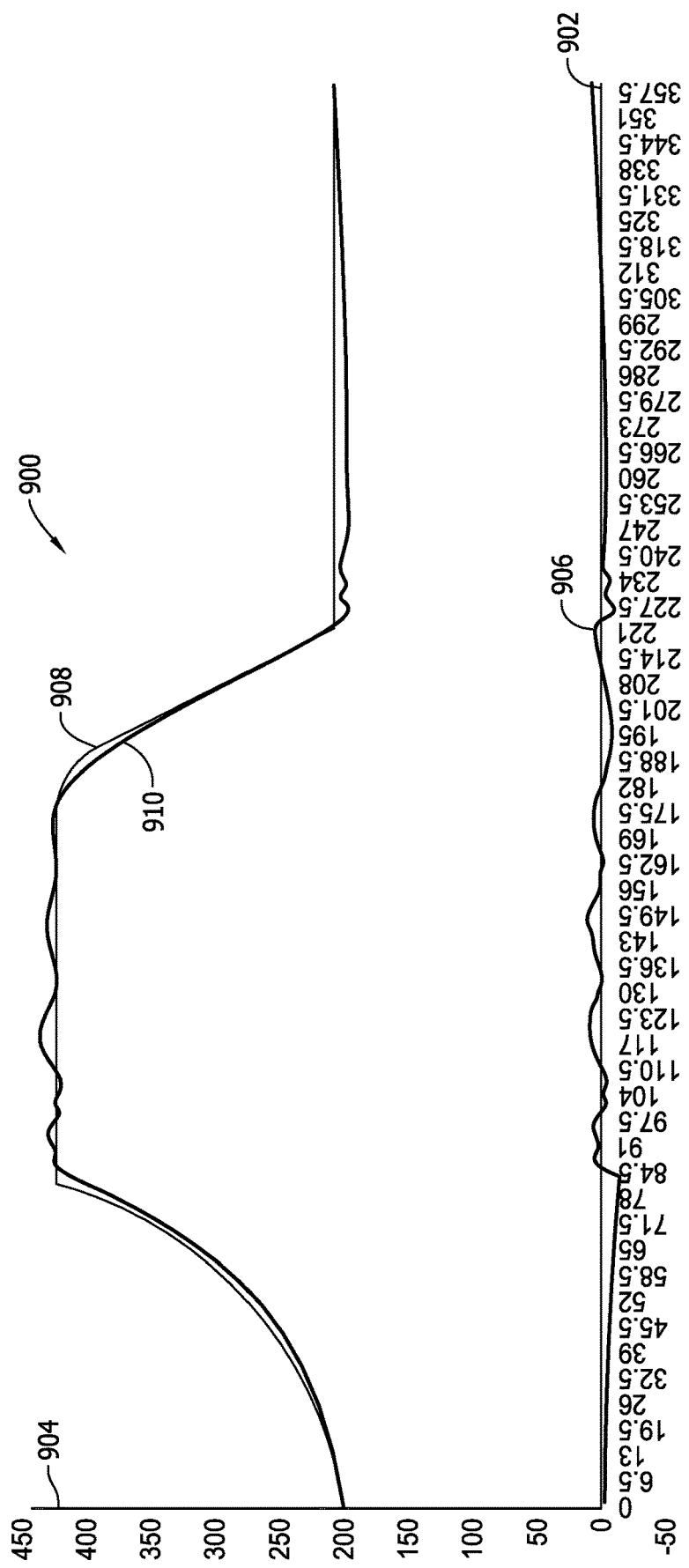

FIG. 9 is a graph 900 of crank end pressure versus crank angle α during another exemplary complete compressor operation cycle of reciprocating compressor 10 (shown in FIG. 1). Graph 900 includes an x-axis 902 graduated in units of rotational position, for example, degrees and a y-axis 904 graduated in units of pressure. A trace 906 illustrates the raw crank end pressure data acquired at each increment of rotational position normalized to the adiabatic curve that can be calculated at each increment of rotational position. A trace 908 illustrates an adiabatic curve that can be calculated at each increment of rotational position. A trace 910 illustrates the raw crank end pressure data acquired at each increment of rotational position.

Figure 10:
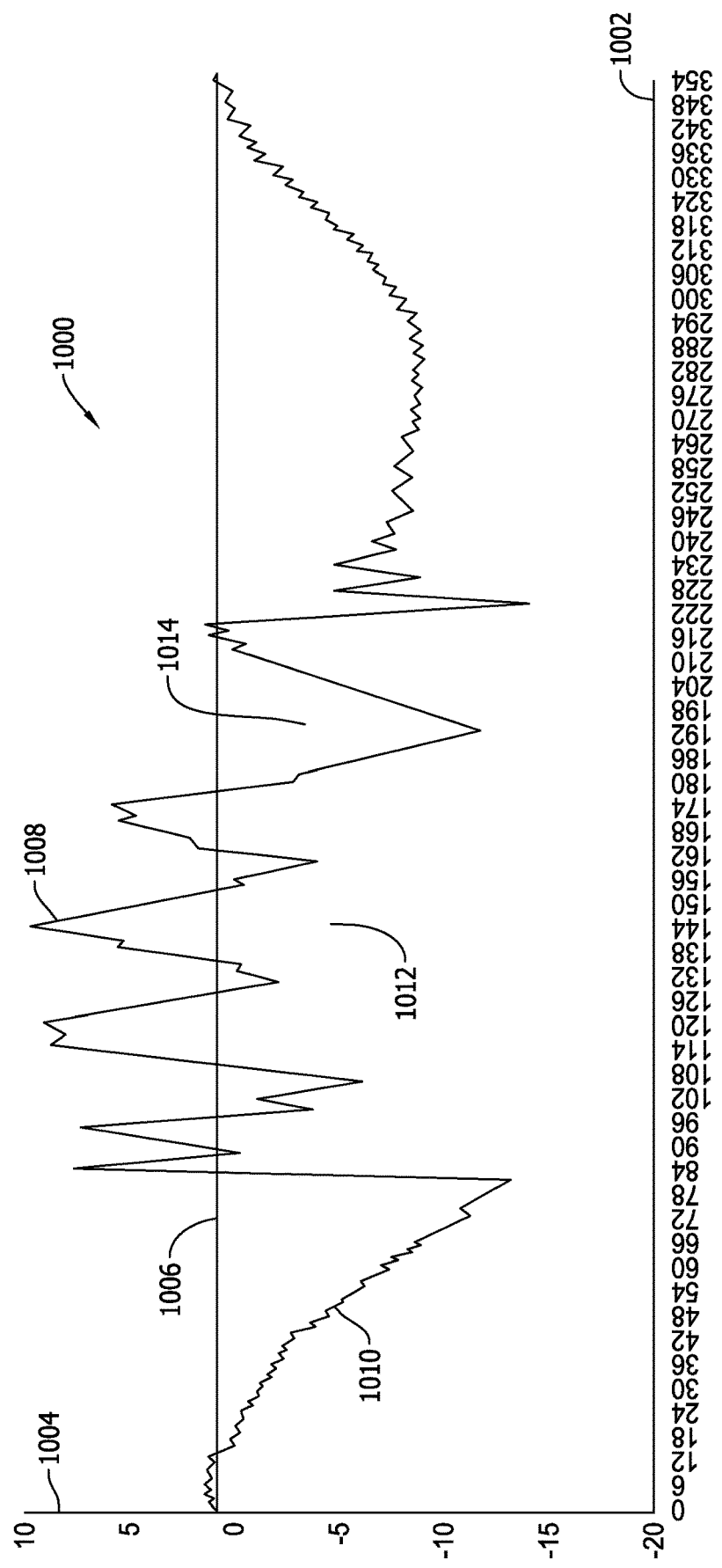

FIG. 10 is a graph 1000 of another representation of graph 900 (shown in FIG. 9) that shows only the normalized raw data with respect to the adiabatic curve at a smaller scale. Graph 1000 includes an x-axis 1002 graduated in units of rotational position, for example, degrees and a y-axis 1004 graduated in units of normalized pressure. A trace 1006 illustrates the adiabatic curve (shown in FIG. 9) that can be calculated at each increment of rotational position. A trace 1008 illustrates the raw crank end pressure data acquired at each increment of rotational position normalized to the adiabatic curve that can be calculated at each increment of rotational position. The accentuated difference between traces 1006 and 1008 relate to anomalies in the operation of reciprocating compressor 10 that can be diagnosed visually by, for example, a human expert or may be analyzed using a processor executing instructions for characterizing the differences and correlating the analyzed characterization to known characterizations associated with known anomalies. For example, a low pressure during compression as shown at trace portion 1010 may indicate a possible suction valve leak. In another example, valve flutter may be indicted as at trace portion 1012 and low pressure during expansion as shown at trace portion 1014 may also indicate a possible suction valve leak.

Figure 11:
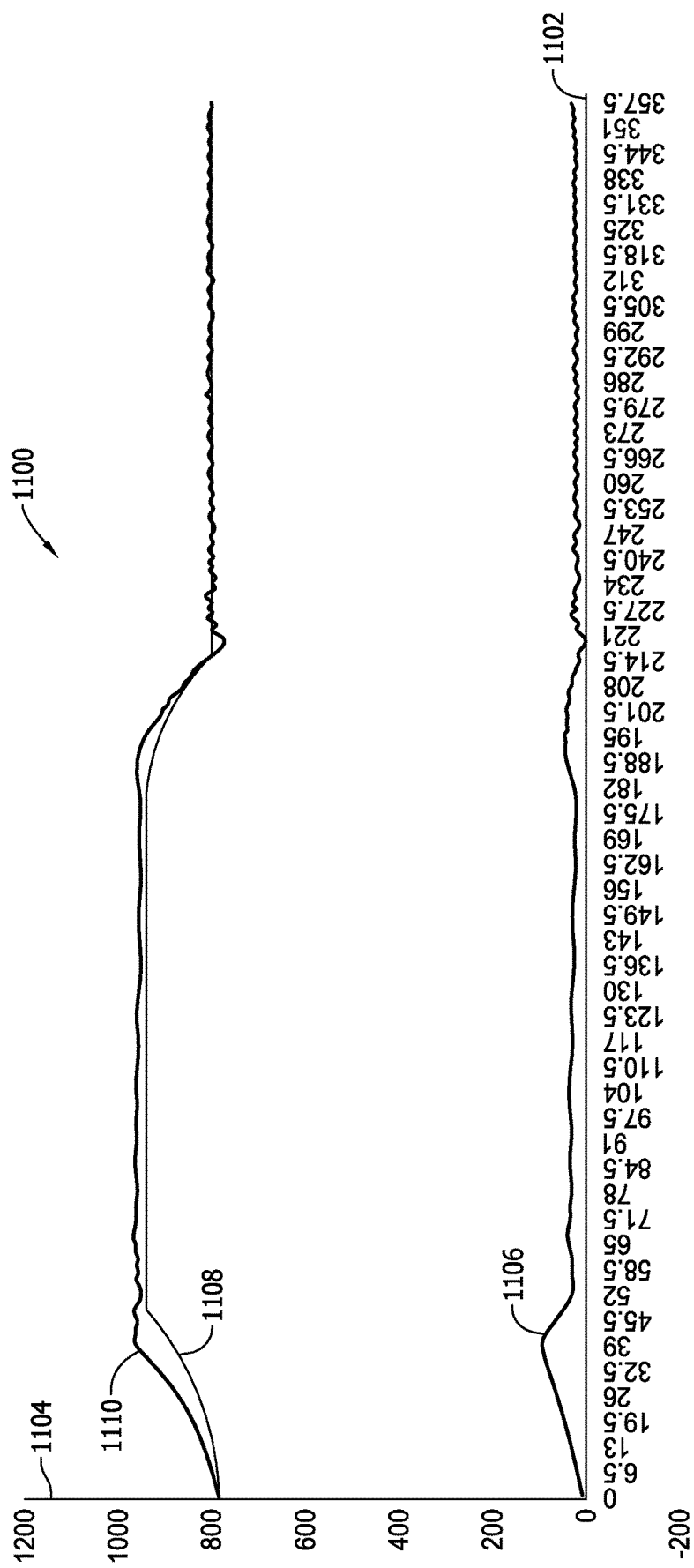

FIG. 11 is a graph 1100 of crank end pressure versus crank angle α during a complete compressor operation cycle of reciprocating compressor 10 (shown in FIG. 1). Graph 1100 includes an x-axis 1102 graduated in units of rotational position, for example, degrees and a y-axis 1104 graduated in units of pressure. A trace 1106 illustrates the raw crank end pressure data acquired at each increment of rotational position normalized to the adiabatic curve that can be calculated at each increment of rotational position. A trace 1108 illustrates an adiabatic curve that can be calculated at each increment of rotational position. A trace 1110 illustrates the raw crank end pressure data acquired at each increment of rotational position.

Figure 12:
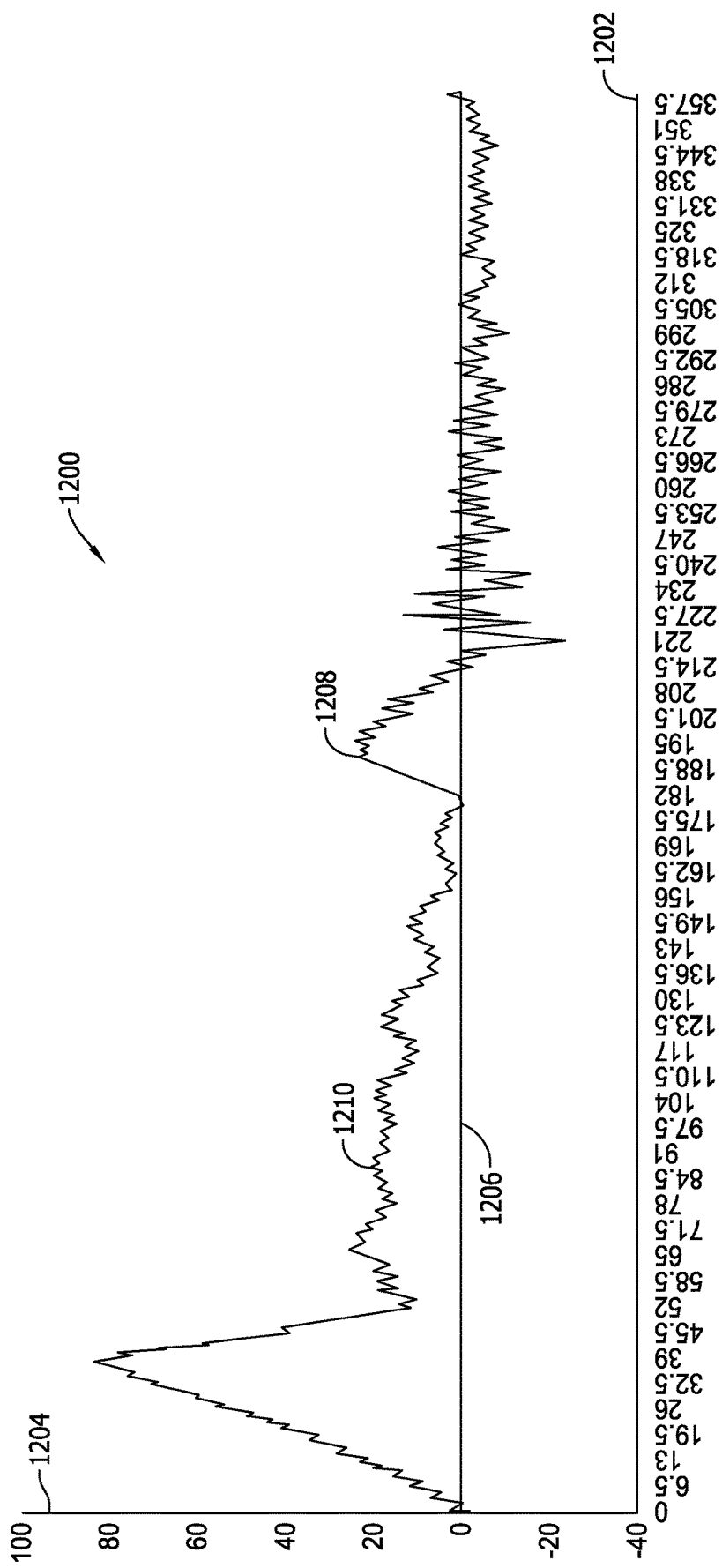

FIG. 12 is a graph 1200 of another representation of graph 1100 (shown in FIG. 11) that shows only the normalized raw data with respect to the adiabatic curve at a smaller scale. Graph 1200 includes an x-axis 1202 graduated in units of rotational position, for example, degrees and a y-axis 1204 graduated in units of normalized pressure. A trace 1206 illustrates the adiabatic curve (shown in FIG. 11) that can be calculated at each increment of rotational position. A trace 1208 illustrates the raw crank end pressure data acquired at each increment of rotational position normalized to the adiabatic curve that can be calculated at each increment of rotational position. The accentuated difference between traces 1206 and 1208 relate to anomalies in the operation of reciprocating compressor 10 that can be diagnosed visually by, for example, a human expert or may be analyzed using a processor executing instructions for characterizing the differences and correlating the analyzed characterization to known characterizations associated with known anomalies. For example, a high pressure during compression, discharge and expansion as shown at trace portion 1208 and trace portion 1210 may indicate a discharge valve leak.

Figure 13:
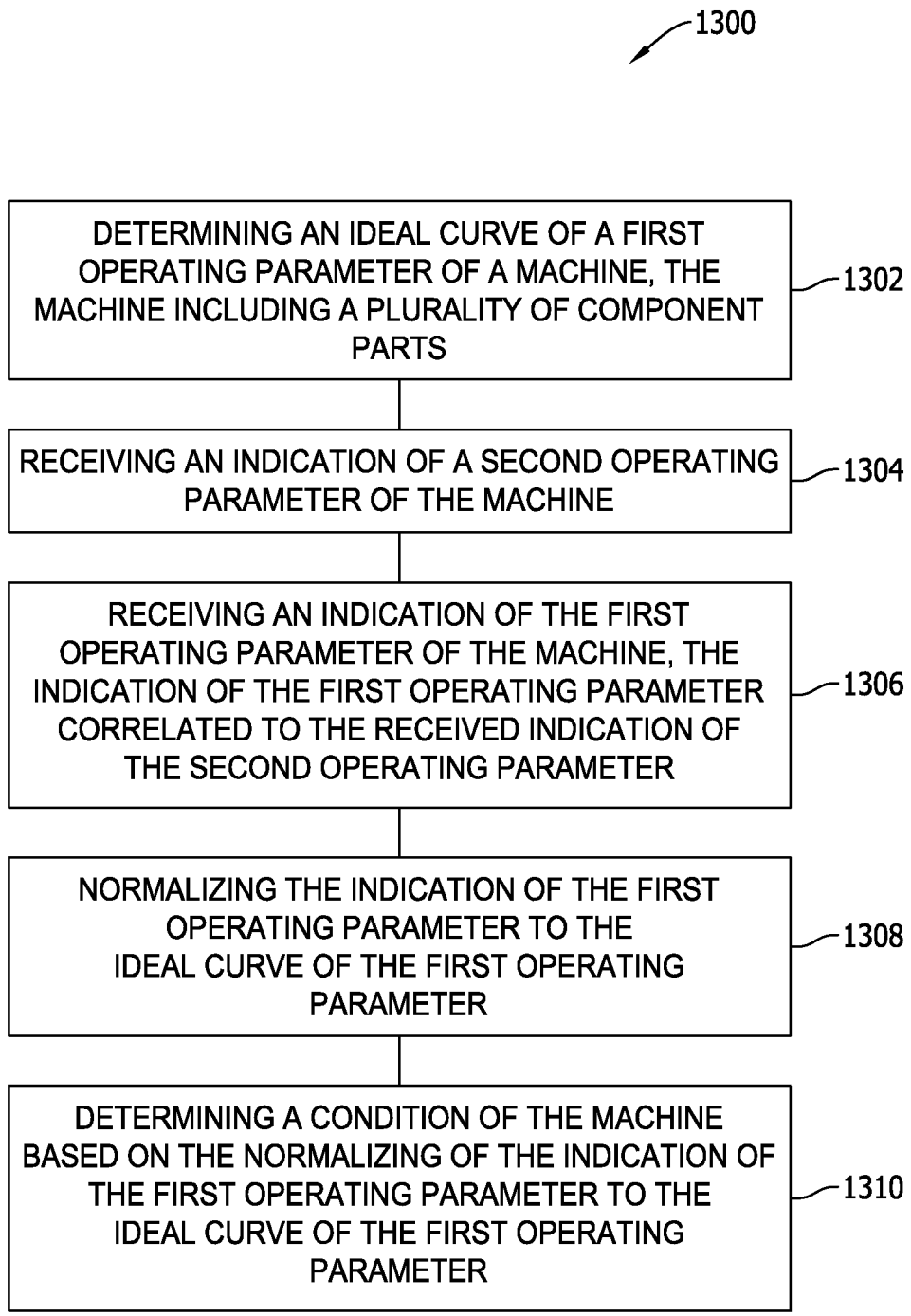

FIG. 13 is a flowchart of an exemplary method 1300 of analyzing machinery operating parameters. Method 1300, however, is exemplary only and not limiting. Method 1300 may be altered, e.g., by having stages added, removed, or rearranged. In the exemplary embodiment, method 1300 can be implemented using a computing device coupled to a user interface and a memory device, although other embodiments are possible.

At stage 1302, method 1300 can include determining an ideal or adiabatic curve of a first operating parameter of a machine wherein the machine can include a plurality of component parts. The ideal curve can be determined using an algorithm or other electronic representation of the machine, where inputs from a plurality of sensors monitoring various process parameters relating to the operation of the machine are used as variables in the algorithm.

At stage 1304, method 1300 can include receiving an indication of a second operating parameter of the machine. The second operating parameter can include a parameter that permits correlating the ideal curve of the first operating parameter and the values of the first operating parameter as collected by the monitoring system and optionally processed in the monitoring system. The raw data representing the second operating parameter may be key phasor information indicating a rotational position of the shaft. The second operating parameter may also be linear position information indicating a position of a piston or valve.

At stage 1306, the method 1300 can include receiving an indication of the first operating parameter of the machine wherein the indication of the first operating parameter is correlated to the received indication of the second operating parameter. In one embodiment, the second operating parameter represents a key phasor or other parameter that facilitates displaying the first operating parameter on the same graph as the ideal curve. The second operating parameter, then represents the values along which the x-axis is plotted. In other embodiments, the second operating parameter may simply represent time, where the first operating parameter and the ideal curve are plotted together along an axis graduated in units of time rather than position.

At stage 1308, method 1300 further can include normalizing the indication of the first operating parameter to the ideal curve of the first operating parameter. Normalizing the indication of the first operating parameter to the ideal curve may be accomplished by adjusting values of the indication of the first operating parameter and/or the ideal curve to account for different scales, or influences of other parameters over one of the first operating parameter and/or the ideal curve but not the other, or not to the same degree. In some embodiments, normalization involves only a rescaling, to arrive at values relative to some size variable.

At stage 1310, method 1300 further can include determining a condition of the machine based on a comparison of the normalized indication of the first operating parameter to the ideal curve of the first operating parameter. In some embodiments, anomalies in the machine operation may easily be detected visually by a trained human operator. As described above various anomalous conditions of the machine exhibit characteristic signatures of related parameters. Am operator may be trained to recognize these characteristic signatures and determine the source of the anomaly. Alternatively, curve-fitting algorithms may be employed to recognize the characteristic signatures and determine many anomalous conditions electronically on a continuous basis in real-time or near real-time.

The foregoing detailed description illustrates embodiments of the disclosure by way of example and not by way of limitation. It is contemplated that the disclosure has general application to the monitoring and control of rotating and reciprocating machinery. It is further contemplated that the methods and systems described herein may be incorporated into existing monitoring and control systems, in addition to being maintained as a separate stand-alone application.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" can include all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly includes a microcontroller, a microcomputer, a programmable logic controller (PLC), an application specific integrated circuit, and other programmable circuits, and these terms are used interchangeably herein.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

While the disclosure has been described in terms of various specific embodiments, it will be recognized that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof, the technical effect of the methods and systems may be achieved by performing at least one of the following steps: (a) determining an ideal curve of a first operating parameter of a machine, the machine including a plurality of component parts, (b) receiving an indication of a second operating parameter of the machine, (c) receiving an indication of the first operating parameter of the machine, the indication of the first operating parameter correlated to the received indication of the second operating parameter, (d) normalizing the indication of the first operating parameter to the ideal curve of the first operating parameter, and (e) determining a condition of the machine based on the normalizing of the indication of the first operating parameter to the ideal curve of the first operating parameter. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of analyzing machinery operation provides a cost-effective and reliable means for automatically receiving, analyzing, and presenting machine operating parameters normalized to an ideal curve of the machine operating parameter to accentuate anomalies in the machine operating parameters. More specifically, the methods and systems described herein facilitate maintaining machinery. In addition, the above-described methods and systems facilitate scheduling outages relating to machinery affected by anomalies manifest by monitoring machine operating parameters. As a result, the methods and systems described herein facilitate maintaining machinery in a high state of readiness in a cost-effective and reliable manner.

Example methods and apparatus for automatically analyzing machine operating conditions are described above in detail. The apparatus illustrated is not limited to the specific embodiments described herein, but rather, components of each may be utilized independently and separately from other components described herein. Each system component can also be used in combination with other system components.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof. "At least one of element A, element B, and element C" is not intended to be limited to at least one of an element A, at least one of an element B, and at least one of an element C.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for analyzing operating parameters of a reciprocating compressor, the reciprocating compressor including a rotating shaft, the method implemented using a computing device coupled to a user interface and a memory device, the method comprising:
   receiving data characterizing a pressure of the reciprocating compressor versus a plurality of increments of rotational positions of the rotating shaft of the reciprocating compressor from a first physical sensor configured to monitor the pressure;
   calculating, by a predetermined model, an ideal curve representative of the pressure of the reciprocating compressor versus the plurality of increments of the rotational positions of the rotating shaft of the reciprocating compressor, the reciprocating compressor including a plurality of component parts, wherein the predetermined model receives the data characterizing the pressure of the reciprocating compressor as an input;
   normalizing the data characterizing the pressure to the ideal curve of the pressure wherein normalizing the pressure comprises scaling the pressure with respect to the ideal curve;
   determining a trace including raw pressure data acquired at each increment of the rotational position normalized to the ideal curve calculated at each increment of the rotational position;
   determining a condition of the reciprocating compressor based on the normalized pressure versus rotational position relative to the ideal curve; and
   providing one or more of the pressure and the condition of the reciprocating compressor to one or more user devices.

2. The method of claim 1, further comprising displaying the normalized pressure versus rotational position relative to the ideal curve.

3. The method of claim 1, further comprising determining the ideal curve using a thermodynamic model of at least a portion of the reciprocating compressor.

4. The method of claim 1, further comprising automatically determining a condition of the reciprocating compressor using a curve fitting algorithm to analyze the normalized data characterizing the pressure with respect to the ideal curve of the pressure.

5. The method of claim 1, further comprising correlating the ideal curve of the pressure and the received data characterizing the pressure versus a plurality of increments of rotational positions of the rotating shaft of the reciprocating compressor.

6. The method of claim 1, further comprising controlling an operation of the reciprocating compressor based on the determined condition of the reciprocating compressor.

7. The method of claim 1, wherein an abnormal condition is determined based on at least a comparison of the trace to the ideal curve.

8. The method of claim 7, wherein, during compression, a swing of the trace from an above-normal normalized pressure to a below-normal normalized pressure relative to the ideal curve indicates the abnormal condition is a possible piston leak.

9. The method of claim 7, wherein, during compression, discharge, expansion and suction, a periodic increase and decrease of a normalized pressure relative to the ideal curve indicates the abnormal condition is possible port resonance.

10. The method of claim 7, wherein, during compression, a below-normal normalized pressure relative to the ideal curve indicates the abnormal condition is a possible suction valve leak.

11. The method of claim 7, wherein, during discharge, a periodic increase and decrease of a normalized pressure relative to the ideal curve indicates the abnormal condition is possible valve flutter.

12. The method of claim 7, wherein, during expansion, a below-normal normalized pressure relative to the ideal curve indicates the abnormal condition is a possible suction valve leak.

13. The method of claim 7, wherein, during compression, discharge and expansion, an above-normal normalized pressure relative to the ideal curve indicates the abnormal condition is a possible discharge valve leak.

14. An analysis system for analyzing operating parameters of a reciprocating compressor including a rotating shaft, the system comprising:
 a computing device communicatively coupled to a user interface and a memory device; and
 one or more sensors configured to generate data characterizing a pressure of the reciprocating compressor versus a plurality of increments of rotational positions of the rotating shaft of the reciprocating compressor;
 the computing device configured to:
 receive data characterizing the pressure of the reciprocating compressor versus the plurality of increments of the rotational positions of the rotating shaft of the reciprocating compressor;
 calculate, by a predetermined model, an ideal curve representative of the pressure of the reciprocating compressor versus the plurality of increments of rotational positions of the rotating shaft of the reciprocating compressor, the reciprocating compressor including a plurality of component parts, wherein the predetermined model receives the data characterizing the pressure of the reciprocating compressor as an input;
 normalize the data characterizing the pressure to the ideal curve of the pressure wherein normalizing the pressure comprises scaling the pressure with respect to the ideal curve;
 determine a trace including raw pressure data acquired at each increment of the rotational position normalized to the ideal curve calculated at each increment of the rotational position;
 determine a condition of the reciprocating compressor based on the normalized pressure versus rotational position relative to the ideal curve; and provide one or more of the pressure and the condition of the reciprocating compressor to one or more user devices.

15. The system of claim 14, wherein the computing device is further configured to output at least one of the normalized data characterizing the pressure and the determined condition through the user interface.

16. The system of claim 14, wherein the computing device is further configured to display the normalized pressure versus rotational position relative to the ideal curve.

17. The system of claim 14, wherein the computing device is further configured to determine the ideal curve using a thermodynamic model of at least a portion of the reciprocating compressor.

18. The system of claim 14, wherein the computing device is further configured to determine the ideal curve using a physics model of at least a portion of the reciprocating compressor.

19. The system of claim 14, wherein the computing device is further configured to automatically determine a condition of the reciprocating compressor using a curve fitting algorithm to analyze the normalized data characterizing the pressure to the ideal curve of the pressure.

20. The system of claim 14, wherein an abnormal condition is determined based on at least a comparison of the trace to the ideal curve.

21. The system of claim 20, wherein, during compression, a swing of the trace from an above-normal normalized pressure to a below-normal normalized pressure relative to the ideal curve indicates the abnormal condition is a possible piston leak.

22. The system of claim 20, wherein, during compression, discharge, expansion and suction, a periodic increase and decrease of a normalized pressure relative to the ideal curve indicates the abnormal condition is possible port resonance.

23. The system of claim 20, wherein, during compression, a below-normal normalized pressure relative to the ideal curve indicates the abnormal condition is a possible suction valve leak.

24. The system of claim 20, wherein, during discharge, a periodic increase and decrease of a normalized pressure relative to the ideal curve indicates the abnormal condition is possible valve flutter.

25. The system of claim 20, wherein, during expansion, a below-normal normalized pressure relative to the ideal curve indicates the abnormal condition is a possible suction valve leak.

26. The system of claim 20, wherein, during compression, discharge and expansion, an above-normal normalized pressure relative to the ideal curve indicates the abnormal condition is a possible discharge valve leak.

27. One or more non-transitory computer-readable storage media having computer-executable instructions embodied thereon, wherein when executed by at least one processor, the computer-executable instructions are configured to cause the processor to:
 receive data characterizing a pressure of a reciprocating compressor versus a plurality of increments of rotational positions of a rotating shaft of the reciprocating compressor from a first physical sensor configured to monitor the pressure;
 calculate, by a predetermined model, an ideal curve representative of the pressure of the reciprocating compressor versus the plurality of increments of rotational positions of the rotating shaft of the reciprocating compressor, the reciprocating compressor including a plurality of component parts, wherein the predetermined model receives the data characterizing the pressure of the reciprocating compressor as an input;
normalize the data characterizing the pressure to the ideal curve of the pressure wherein normalizing the pressure comprises scaling the pressure with respect to the ideal curve;
determine a trace including raw pressure data acquired at each increment of the rotational position normalized to the ideal curve calculated at each increment of the rotational position;
determine a condition of the reciprocating compressor based on the normalized pressure versus rotational position relative to the ideal curve; and
provide one or more of the pressure and the condition of the reciprocating compressor to one or more user devices.

28. The computer-readable storage media of claim 27, wherein the computer-executable instructions further cause the processor to display the normalized pressure versus rotational position relative to the ideal curve.

29. The computer-readable storage media of claim 27, wherein the computer-executable instructions further cause the processor to determine the ideal curve using a thermodynamic model of at least a portion of the reciprocating compressor.

30. The computer-readable storage media of claim 27, wherein the computer-executable instructions further cause the processor to automatically determine a condition of the reciprocating compressor using a curve fitting algorithm to analyze the normalized indication of the pressure to the ideal curve of the pressure.

31. The computer-readable storage media of claim 27, wherein an abnormal condition is determined based on at least a comparison of the trace to the ideal curve.

32. The computer-readable storage media of claim 31, wherein, during compression, a swing of the trace from an above-normal normalized pressure to a below-normal normalized pressure relative to the ideal curve indicates the abnormal condition is a possible piston leak.

33. The computer-readable storage media of claim 31, wherein, during compression, discharge, expansion and suction, a periodic increase and decrease of a normalized pressure relative to the ideal curve indicates the abnormal condition is possible port resonance.

34. The computer-readable storage media of claim 31, wherein, during compression, a below-normal normalized pressure relative to the ideal curve indicates the abnormal condition is a possible suction valve leak.

35. The computer-readable storage media of claim 31, wherein, during discharge, a periodic increase and decrease of a normalized pressure relative to the ideal curve indicates the abnormal condition is possible valve flutter.

36. The computer-readable storage media of claim 31, wherein, during expansion, a below-normal normalized pressure relative to the ideal curve indicates the abnormal condition is a possible suction valve leak.

37. The computer-readable storage media of claim 31, wherein, during compression, discharge and expansion, an above-normal normalized pressure relative to the ideal curve indicates the abnormal condition is a possible discharge valve leak.

* * * * *